US009286265B2

(12) United States Patent
Simard et al.

(10) Patent No.: US 9,286,265 B2
(45) Date of Patent: Mar. 15, 2016

(54) DEVICE AND METHOD FOR MANAGING AN ELECTRONIC CONTROL UNIT OF A VEHICLE

(75) Inventors: Christian Simard, Terrebonne (CA); Patrick Meilleur, Repentigny (CA)

(73) Assignee: INNOVATION GAP INC., Repentigny (CA)

( * ) Notice: Subject to any disclaimer, the term of this patent is extended or adjusted under 35 U.S.C. 154(b) by 0 days.

(21) Appl. No.: 13/882,140

(22) PCT Filed: Oct. 28, 2011

(86) PCT No.: PCT/CA2011/001209
§ 371 (c)(1),
(2), (4) Date: Apr. 26, 2013

(87) PCT Pub. No.: WO2012/167343
PCT Pub. Date: Dec. 13, 2012

(65) Prior Publication Data
US 2013/0218371 A1 Aug. 22, 2013

Related U.S. Application Data

(60) Provisional application No. 61/407,655, filed on Oct. 28, 2010.

(51) Int. Cl.
*G06F 19/00* (2011.01)
*G01M 17/00* (2006.01)
(Continued)

(52) U.S. Cl.
CPC ............. *G06F 17/00* (2013.01); *B60W 50/045* (2013.01); *B60W 50/08* (2013.01); *B60R 16/0232* (2013.01); *G07C 5/085* (2013.01); *G07C 5/0808* (2013.01)

(58) Field of Classification Search
CPC .......... G06F 17/00; G06F 7/00; G05D 1/0011; B64C 19/00; G07C 5/008
See application file for complete search history.

(56) References Cited

U.S. PATENT DOCUMENTS 5,532,927 A 7/1996 Pink et al.
6,832,141 B2 * 12/2004 Skeen ..................... G07C 5/008
340/439

(Continued)

FOREIGN PATENT DOCUMENTS

CA 2719990 A1 12/2009
KR 20050026232 A 3/2005

OTHER PUBLICATIONS

International Search Report for International Application No. PCT/CA2011/001209, mailed Jan. 19, 2012, 4 pgs.

*Primary Examiner* — James Trammell
*Assistant Examiner* — Demetra Smith-Stewart
(74) *Attorney, Agent, or Firm* — McDermott Will & Emery LLP

(57) ABSTRACT

An add-on device and method for managing an electronic control unit (ECU) of a vehicle is disclosed. The add-on device includes a transceiver adapted for communicating with the communication network of a vehicle. The add-on device further includes a controller being communicatively connected to the transceiver, and adapted to generate a user-interface control signal addressed to the user interface of the vehicle, in order to manipulate the user interface of the vehicle and to present thereon command options prompting a user to enter a command selection in response to the command options presented. The controller is further adapted to receive the command selection from the user interface, and to generate in response thereto, an ECU control signal to be sent to the communication network for executing an operation with respect to a targeted ECU, in order to manage the targeted ECU from the user interface of the vehicle.

16 Claims, 3 Drawing Sheets

(51) Int. Cl.
*G07C 5/08* (2006.01)
*G06F 17/00* (2006.01)
*B60W 50/08* (2012.01)
*B60W 50/04* (2006.01)
*B60R 16/023* (2006.01)

(56) References Cited

U.S. PATENT DOCUMENTS

| | | |
|---|---|---|
| 7,069,125 B2 | 6/2006 | Namaky et al. |
| 7,350,159 B2 | 3/2008 | Cancilla et al. |
| 7,519,458 B2 | 4/2009 | Buckley |
| 8,638,207 B2* | 1/2014 | Drew ............... B60R 16/0232 340/438 |
| 2003/0093199 A1* | 5/2003 | Mavreas .................... 701/33 |
| 2005/0096809 A1* | 5/2005 | Skeen .................. G07C 5/008 701/31.4 |
| 2005/0131595 A1 | 6/2005 | Luskin et al. |
| 2007/0100520 A1 | 5/2007 | Shah et al. |
| 2008/0015748 A1 | 1/2008 | Nagy |
| 2008/0195299 A1 | 8/2008 | Barnicle et al. |
| 2008/0255888 A1* | 10/2008 | Berkobin et al. ............ 705/4 |
| 2008/0294303 A1 | 11/2008 | King et al. |
| 2009/0240391 A1 | 9/2009 | Duddle et al. |
| 2009/0271067 A1* | 10/2009 | Underdal et al. ............ 701/35 |
| 2009/0326757 A1 | 12/2009 | Andreasen et al. |
| 2010/0017236 A1 | 1/2010 | Duddle et al. |
| 2010/0145571 A1 | 6/2010 | Kwon et al. |
| 2010/0204878 A1 | 8/2010 | Drew et al. |
| 2012/0109417 A1* | 5/2012 | Berkobin et al. ............ 701/1 |

* cited by examiner

DEVICE AND METHOD FOR MANAGING AN ELECTRONIC CONTROL UNIT OF A VEHICLE

RELATED APPLICATIONS

This application is the U.S. National Phase under 35 U.S.C. §371 of International Application No. PCT/CA2011/001209, filed on Oct. 28, 2011, which in turn claims the benefit of U.S. Provisional Application No. 61/407,655, filed on Oct. 28, 2010, the disclosures of which Applications are incorporated by reference herein.

FIELD OF THE INVENTION

The present invention relates to the field of interfacing with vehicle components. More particularly, the present invention relates to add-on device for a vehicle for managing an electronic control unit (ECU) of the vehicle, as well as to a method, to a kit and to a processor-readable product for providing the same.

BACKGROUND OF THE INVENTION

Known in the art are diagnostic tools, generally used for reading indicators as to the state of health for various electronic modules of a vehicle. Most of today's vehicles have on-board self-diagnostic and reporting capabilities to help maintain or repair various systems in these vehicles.

The mass production of fuel injected vehicles in the 1980's and the environmental regulations imposed have made on-board diagnostic (OBD) systems mandatory on most vehicles. Early systems were limited to illuminating a warning light for indicating the presence of an error, and external tools or devices were not necessary to obtain diagnostic information. Buttons or jump wires were used to put the system into diagnostic mode and the light would indicate the information or code by emitting a series of flashes. In more recent days, vehicles have more electronic modules and components and on-board diagnostic systems are therefore more complex. Modern OBD systems in vehicles include communication ports (or "OBD connector") which are connected to the vehicles communication network (data bus, etc.) being in turn interconnected with the various electronic modules of the vehicles. Most vehicles today have connections made through the SAE standard J1962 which defines connecters and connections of the OBD-II type. The communication ports allow accessing real-time data relating to the electronic modules (status, diagnostic trouble codes, etc.). Thus, special tools are required to connect to the vehicle's communication ports for reading information and further presenting the information to a user. More particularly, such tools include devices adapted to retrieve data from the vehicle and to display information on a display screen of the device or of another device such as a computer.

Currently, a vast number of handheld and computer based scan tools are available on the market for the public, as well as for technicians and dealerships. Such devices range from relatively simple handheld devices available to consumers for a cost which is generally lower than more complex and expensive tools made especially for dealerships. The connections between the tool and the vehicle are usually made through a cable or a wireless device (using for example Bluetooth™ technology). The information is then retrieved from the different sources and is interpreted and presented by the handheld tool or by a computer. In some case, user commands or information may also be entered at the handheld device, using buttons or the like, or at the computer.

However, such tools are generally bulky and relatively expensive to manufacture, as well as to support and maintain, given that they have elaborate electronic components and circuitry, namely a display screen, buttons, or the like, as well as the related circuitry. Moreover, the user is required to enter commands and information as well as view and receive information through an external device, which is typically handheld, and which may be awkward to handle and manipulate, given the normal driver's position in a vehicle.

For example, known to the Applicant are U.S. Pat. Nos. 5,532,927; 7,069,125 B2; 7,350,159 B2; and 7,519,458 B2; as well as United States Patent Applications: No. 2005/0131595 A1; No. 2007/0100520 A1; No. 2008/0015748 A1; No. 2008/0195299 A1; No. 2008/0294303 A1; No. 2009/0240391 A1; No. 2009/0326757 A1; No. 2010/0017236 A1; No. 2010/0145571 A1; and No. 2010/0204878 A1.

Also known in the art are diagnostic and/or adjustment devices adapted for a unique functionality, such as for example erasing a fault code. However, by definition, such devices are generally limited in terms of use.

Hence, in light of the aforementioned, there is a need for an improved system which, by virtue of its design and components, would be able to overcome some of the above-discussed prior art concerns.

SUMMARY OF THE INVENTION

The object of the present invention is to provide a device which, by virtue of its design and components, satisfies some of the above-mentioned needs and is thus an improvement over other related diagnostic tools, vehicle component interface device and/or associated method known in the prior art.

In accordance with an aspect of the present invention, the above mentioned object is achieved, as will be easily understood, by an add-on device for managing an electronic control unit (ECU) of a vehicle and/or by a corresponding method, such as the one briefly described herein and such as the one exemplified in the accompanying drawings.

It is to be understood that the vehicle includes one or more ECU, a communication network linked thereto for circulating data related to the one or more ECU, and a user interface being integrated in the vehicle and communicating with the communication network. The vehicle further includes a vehicle interface communicating with the communication network. In accordance with an aspect of the present invention, the add-on device comprises a transceiver adapted to cooperate with the vehicle interface for communicating with the communication network. The add-on device further comprises a controller being communicatively connected to the transceiver, and adapted to generate a user-interface control signal being addressed to the user interface, in order to manipulate the user interface of the vehicle and to present thereon command options prompting a user to enter a command selection in response thereto, the command selection being representative of an operation to be executed with respect to a targeted one of the one or more ECU, the controller being further adapted to receive the command selection from the user interface, and to generate in response thereto, an ECU control signal to be sent via the transceiver, to the communication network for executing said operation, in order to manage the targeted ECU from the user interface of the vehicle.

In accordance with another aspect of the present invention, there is provided a method for managing an ECU of a vehicle, the vehicle having one or more of said ECU, a communication network linked thereto for circulating data related to the one or more ECU, a user interface integrated in the vehicle and communicating with the communication network, and a vehicle interface communicating with the communication network. The method comprises: (a) generating a user-interface control signal, by means of a controller in an add-on device, the user-interface control signal being addressed to the user interface of the vehicle in order to manipulate said user interface; (b) sending the user-interface control signal, by means of a transceiver communicatively connecting the controller with the vehicle interface, onto the communication network of the vehicle, in order to present on said user interface, command options prompting a user to enter a command selection in response thereto; (c) receiving the command selection, at the controller, via the communication network and vehicle interface, the command selection being representative of an operation to be executed with respect to a targeted one of the one or more ECU; (d) generating, by means of the controller, an ECU control signal in response to the command selection received; and (e) sending the ECU control signal, by means of the transceiver, to the communication network for executing said operation, in order to manage the targeted ECU from the user interface of the vehicle.

In accordance with yet another aspect of the present invention, there is provided a processor-readable storage medium for managing an ECU of a vehicle having one or more of said ECU, a communication network linked thereto for circulating data related to the one or more ECU, and a user interface integrated in the vehicle and communicating with the communication network, the vehicle further having a vehicle interface communicating with the communication network. The processor-readable storage medium comprises data and instructions for execution by a controller in an add-on device to: (a) generate a user-interface control signal being addressed to the user interface of the vehicle in order to manipulate said user interface; (b) send the user-interface control signal, by means of a transceiver communicatively connecting the controller with the vehicle interface, onto the communication network of the vehicle, in order to present on said user interface, command options prompting a user to enter a command selection in response thereto; (c) receive the command selection, the command selection being representative of an operation to be executed with respect to a targeted one of the one or more ECU; (d) generate an ECU control signal in response to the command selection received; and (e) send the ECU control signal, by means of the transceiver, to the communication network for executing said operation, in order to manage the targeted ECU from the user interface of the vehicle.

In accordance with yet another aspect of the present invention, there is provided an add-on kit for managing an ECU of a vehicle having one or more of said ECU, a communication network linked thereto for circulating data related to the one or more ECU, and a user interface being integrated in the vehicle and communicating with the communication network, the vehicle further having a vehicle interface communicating with the communication network. The add-on kit comprises: a transceiver adapted to cooperate with the vehicle interface for communicating with the communication network. The add-on kit further comprises a controller being adapted to communicate with the transceiver, and being further adapted to generate a user-interface control signal addressed to said user interface of the vehicle and to present thereon command options prompting a user to enter a command selection in response thereto, the command selection being representative of an operation to be executed with respect to a targeted one of the one or more ECU, the controller being further adapted to receive the command selection from the user interface, and to generate in response thereto, an ECU control signal to be sent via the transceiver, to the communication network for executing said operation, in order to manage the targeted ECU from the user interface of the vehicle.

In accordance with still an aspect of the present invention, there is provided a vehicle being provided with the above-mentioned add-on device, kit and/or processor-readable storage medium.

Embodiments of the present invention are advantageous in that, since the user interface components are provided in the vehicle, the device requires minimal electronic components in comparison to similar devices known in the art, which in turn considerably reduces costs for manufacturing, as well as for shipping (minimal weight and volume). Moreover, the add-on device, according to embodiments thereof, is self-contained and easily portable, in that it requires no additional cable, computer or external power supply in normal use. Indeed, the add-on device uses, for example, switches and a display screen integrated in the vehicle, as its interface.

Preferably, the vehicle has an electronic component or module to be diagnosed, a user interface, a communication network linking the electronic component with the user interface. The user interface may include for example a display screen (message center, liquid crystal display (LCD) screen, etc), an instrument cluster, command buttons, a touchscreen and/or the like. The communication network typically includes one or more data bus and may further include intermediate components (for example: a gateway module) to provide communication between data buses. The communication network allows circulating, usually upon request, diagnosis information (status information, error codes, etc.) relating to the electronic component or other component/device/module of the vehicle, as well as sending information to the user interface for presenting to the user. Moreover, user commands may be input by a user through the user interface for transmittal to the electronic component via the communication network. The vehicle may further have an OBD connection port connected to the vehicle's communication network.

Preferably, the diagnostic device comprises: a transceiver for communicating with the communication network of the vehicle, with respect to information related to the electronic component of the vehicle; a user interface communication means for exchanging information with the vehicle's user interface; and a controller for receiving and processing data from the transceiver, and generating an output message to be presented on the vehicle's user interface.

Preferably, the tool is an electronic device comprising a housing having therein a microcontroller, a memory, a transceiver for each vehicle data bus, a PCB (printed circuit board) and suitable circuitry for linking the afore-mentioned components, as well as a an OBD connector extending from the housing and adapted to connect with the OBD connection port of the vehicle.

Preferably, the diagnostic tool, not only communicates with the vehicle's data bus(es) but further uses components provided within the vehicle, namely the user interface (command buttons, display screens, instrument cluster, etc.) for allowing user control and/or presenting information to the user. Therefore, no additional computer, handheld equipment or any other apparatus other than the vehicle itself is necessary for providing a user interface. The diagnostic device may be connected to the OBD connector or any other suitable connector (including a permanent or semi-permanent wire connection). It could also be envisaged that a vehicle is provided with a wireless OBD connection port and that the transceiver of the device is provided with a compatible wireless communication means for communicating with the vehicle wirelessly.

Embodiments of the present invention are advantageous in that the system may use existing vehicle command devices, such as buttons provided on the steering wheel as a means to control the add-on device (i.e. or diagnostic tool). Moreover, the device uses existing user interface components of the vehicle, such as display components, which may include an information message center in the instrument cluster, for displaying or presenting information to the user.

Preferably, there is provided a method for a diagnostic device adapted for a vehicle, the method comprising: reading data from a communication network of the vehicle, said data relating to the electronic component of the vehicle; receiving and processing the data, and generating an output message based on the processed data, to be output on the vehicle's user interface; and sending the output message onto the communication network of the vehicle.

Preferably, there is provided a vehicle having a device and/or a system, as described herein and/or enabled to perform the method described herein, in order to provide diagnosis information relating to the vehicle and/or adjustment capabilities thereon.

Preferably, there is provided a processor-readable product comprising data and instructions, for execution by a CPU to: read data from a communication network of the vehicle, said data relating to the electronic component of the vehicle; receive and process the data, and generate an output message based on the processed data, to be output on the vehicle's user interface; and send the output message onto the communication network of the vehicle.

The objects, advantages and features of the present invention will become more apparent upon reading of the following non-restrictive description of preferred embodiments thereof, given for the purpose of exemplification only, with reference to the accompanying drawings.

DETAILED DESCRIPTION OF PREFERRED EMBODIMENTS OF THE INVENTION

Figure 1:
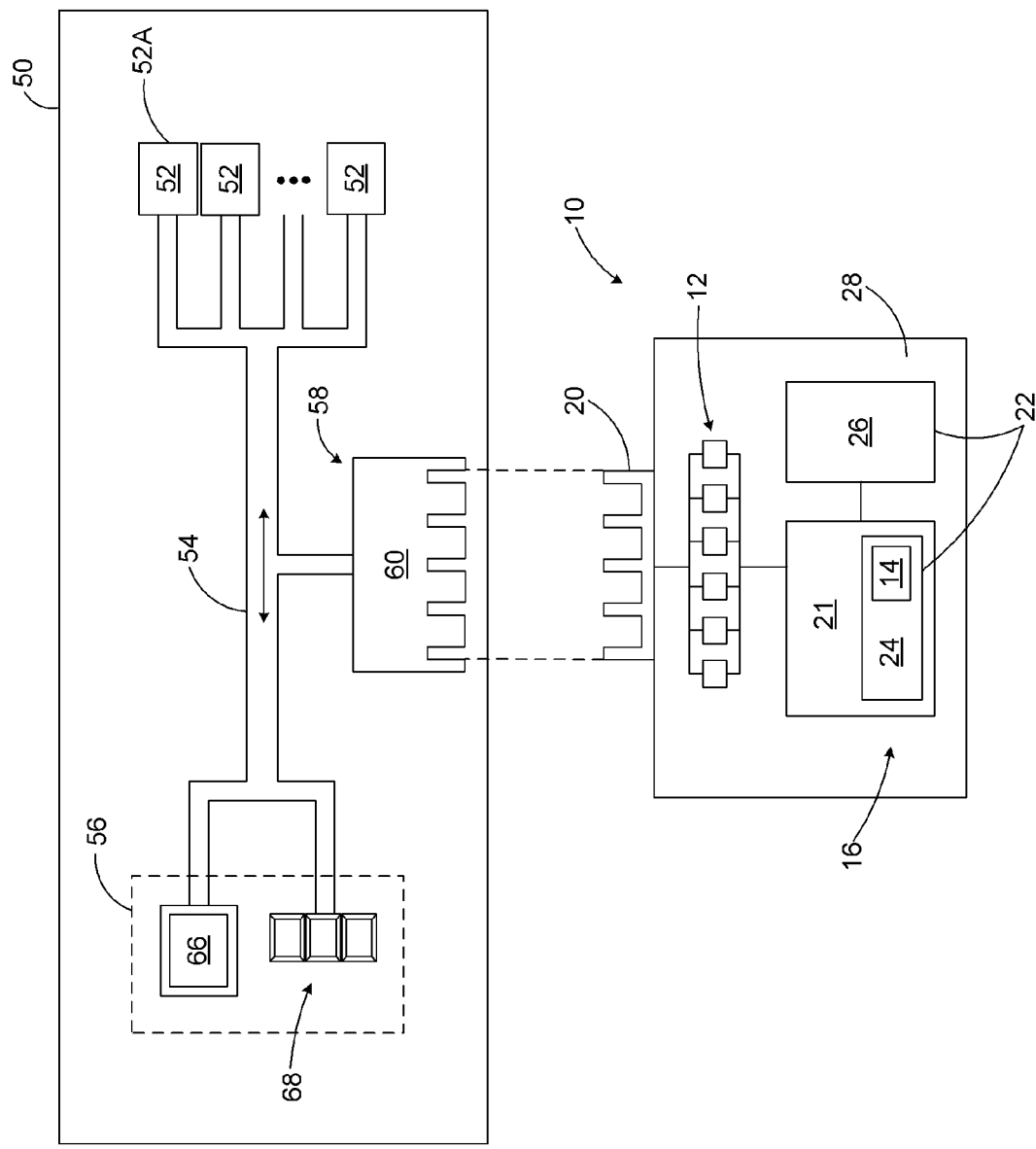
FIG. 1 is a diagram schematically showing an add-on device for a vehicle and components of the vehicle, according to an embodiment of the present invention.

In the following description, the same numerical references refer to similar elements. The embodiments, geometrical configurations, materials mentioned and/or dimensions shown in the figures or described in the present description are preferred embodiments only, given for exemplification purposes only.

In the context of the present invention, the expressions "device", "add-on device", "tool", "electronic device" and any other equivalent expression and/or compound words thereof known in the art will be used interchangeably. Furthermore, the same applies for any other mutually equivalent expressions, such as "ECU", "electronic component", "vehicle component", "electronic module", "module" and any other equivalent expression and/or compound words thereof, as well as for "communication network" and "communication system", for example, as also apparent to a person skilled in the art. Furthermore, and also in the context of the present description, the expressions "data buses", "gateway module", "I-bus™", "DS2™ data bus" may also be used interchangeably when referring to components of the communication network of the vehicle. The same goes for "diagnostic connector port", "OBD connection port", "OBD port", and/or equivalent expression. Similarly, the expressions "Instrument Pack ECU", "information message center", "Information center" and other equivalent expressions may also be used interchangeably, as can be easily understood.

In addition, although the preferred embodiment of the present invention as illustrated in the accompanying drawings comprises components such as an OBD connector, cruise control command buttons, a microprocessor, a memory, etc., and although the device interacts with vehicle components such as "DS2™ data bus", an "I-bus™", etc., and although the associated method include steps as explained and illustrated herein, not all of these components, configurations and steps are essential to the invention and thus should not be taken in their restrictive sense, i.e. should not be taken as to limit the scope of the present invention. It is to be understood, as also apparent to a person skilled in the art, that other suitable components and cooperations thereinbetween, as well as other suitable configurations, organizations and/or architectures may be used for the add-on device according to the present invention, as will be briefly explained herein and as can be easily inferred herefrom, by a person skilled in the art, without departing from the scope of the invention. Moreover, the order of the steps provided herein should not be taken as to limit the scope of the invention, as the sequence of the steps may vary in a number of ways according to some embodiments of the present invention, without affecting the scope or working of the invention, as can also be understood by the skilled person.

Broadly described, the present invention provides, for example, an OBD device for diagnosing and/or adjusting parameters used or generated by an electronic component in a vehicle. Such a device may be plugged into the OBD connector of the vehicle, which provides communication for data circulating in the vehicle (i.e. the vehicle's communication network) and cooperates with the vehicle's user interface, in order to provide an add-on device which is small and simple, relative to known systems, which is therefore easier and economical to manufacture and ship, versatile (adaptable in a number of ways, based on the data provided by the vehicle and user interface capabilities), reliable (fewer electronic components and therefore lower risk of error and malfunction) and user-friendly (via user interface, which the user is already familiar with and which is generally suitably positioned for the driver), so as to avoid bulky and/or cumbersome handheld devices and/or computers known in the art.

In accordance with an embodiment of the present invention, with reference to FIG. 1, there is provided an add-on device 10 for managing an electronic control unit (ECU) of a vehicle 50. The vehicle 50 includes at least one of said ECU 52. The vehicle 50 further includes a communication network 54 linked thereto for circulating data related to the one or more ECU 52. The vehicle 50 further includes a user interface 56 being integrated in the vehicle 50 and communicating with the communication network 54. The vehicle 50 further has a vehicle interface 58 communicating with the communication network 54. The add-on device 10 comprises a transceiver 12 adapted to cooperate with the vehicle interface 58 for communicating with the communication network 54 of the vehicle 50. The add-on device 10 further includes a controller 16 being communicatively connected to the transceiver 12, and adapted to generate a user-interface control signal 84 (see FIG. 2) addressed to said user interface 56 of the vehicle 50, in order to manipulate the user interface 56 and to present thereon command options prompting a user to enter a command selection 86 (see FIG. 2) in response thereto. The command selection 86 is representative of an operation to be executed with respect to a targeted ECU $52_A$. The controller 16 is further adapted to receive the command selection 86 from the user interface 56, and to generate in response to the command selection 86, an ECU control signal 88 to be sent via the transceiver 12, to the communication network 54 for executing said operation, in order to manage the targeted ECU $52_A$ from the user interface 56 of the vehicle 50.

The data which circulates on the vehicle's communication network may include status data being regularly pushed onto the network, information being pulled from an ECU upon request, a control signal sent to an ECU to perform an operation on the ECU or request information from the ECU, and/or the like.

The vehicle's "user interface" comprises one or more user interface component, including for example, a display screen (message center, LCD (liquid crystal display) screen, etc), an instrument cluster, command buttons, a touchscreen and/or the like, as mentioned previously. The communication network 54 typically includes one or more data bus and may further include intermediate components (for example: a gateway module) to provide communication between data buses, as also previously mentioned, and as will be better explained hereinbelow.

The "vehicle interface" may comprise an OBD connector port adapted to receive a corresponding OBD connector of the add-on device. Alternatively or additionally, the vehicle interface may provide a wire connection which is similarly in communication with the communication network of the vehicle, so as to provide a permanent or semi-permanent connection with the add-on device. According to an embodiment of the present invention, the vehicle interface is provided with wireless communication means, so as to connect wireless with the transceiver over a wireless signaling mechanism or communication network.

In view of the above, the transceiver may be connected to the vehicle interface, via the OBD connector, so as to be removably connected (i.e. plug-in/plug-out), or via a more permanent connection, such as a wire connection. Moreover, according to an embodiment, the transceiver is provided integrally with the add-on device, so as to be physically connected to the controller. According to an alternative embodiment, the transceiver and the controller are provided in physically distinct devices and adapted to communicate wirelessly. Indeed, it is meant by "communicatively connected" that the transceiver is adapted to communicate with the controller and visa versa, with or without a physical connection therebetween.

The term "controller", refers to an electronic circuitry capable of executing computer instructions, such as or provided within a central processing unit (CPU), a microprocessor, a processor and/or the like. A plurality of interconnected controllers may be provided, according to embodiments of the present invention.

An "operation" (to be executed with respect to a targeted ECU) may include reading status information being broadcasted on the vehicle's communication network, requesting and retrieving information from an ECU, sending a control signal and/or information to an ECU (for example, changing a parameter of an ECU, reprogramming an ECU, reconfiguring an ECU and/or resetting a parameter of an ECU, etc.), as will be better described hereinbelow. Also, it is to be understood that the components forming the user interface are normally also controlled by a corresponding ECU, as will be better explained below. Thus, the "operation" may include an operation performed with respect to the user interface.

It is to be understood that the user-interface control signal and/or the ECU control signal comprises instructions to perform a control operation on the user interface and/or targeted ECU, respectively. Furthermore, the user-interface control signal and/or the ECU control signal are preferably provided in a suitable format (according to a suitable communication protocol) in order to be received and processed at the user interface and/or targeted ECU, respectively, as will be better explained hereinbelow. The user-interface control signal and/or ECU control signal may further include data, in the form of a message, so as to provide content (for example, a text to be displayed on a display screen, or a value to enter as a parameter of the ECU).

Thus, in the context of the present invention, the term "managing" (i.e. "to manage the targeted ECU from the user interface") means a monitoring or control operation and/or the like.

Figure 2:
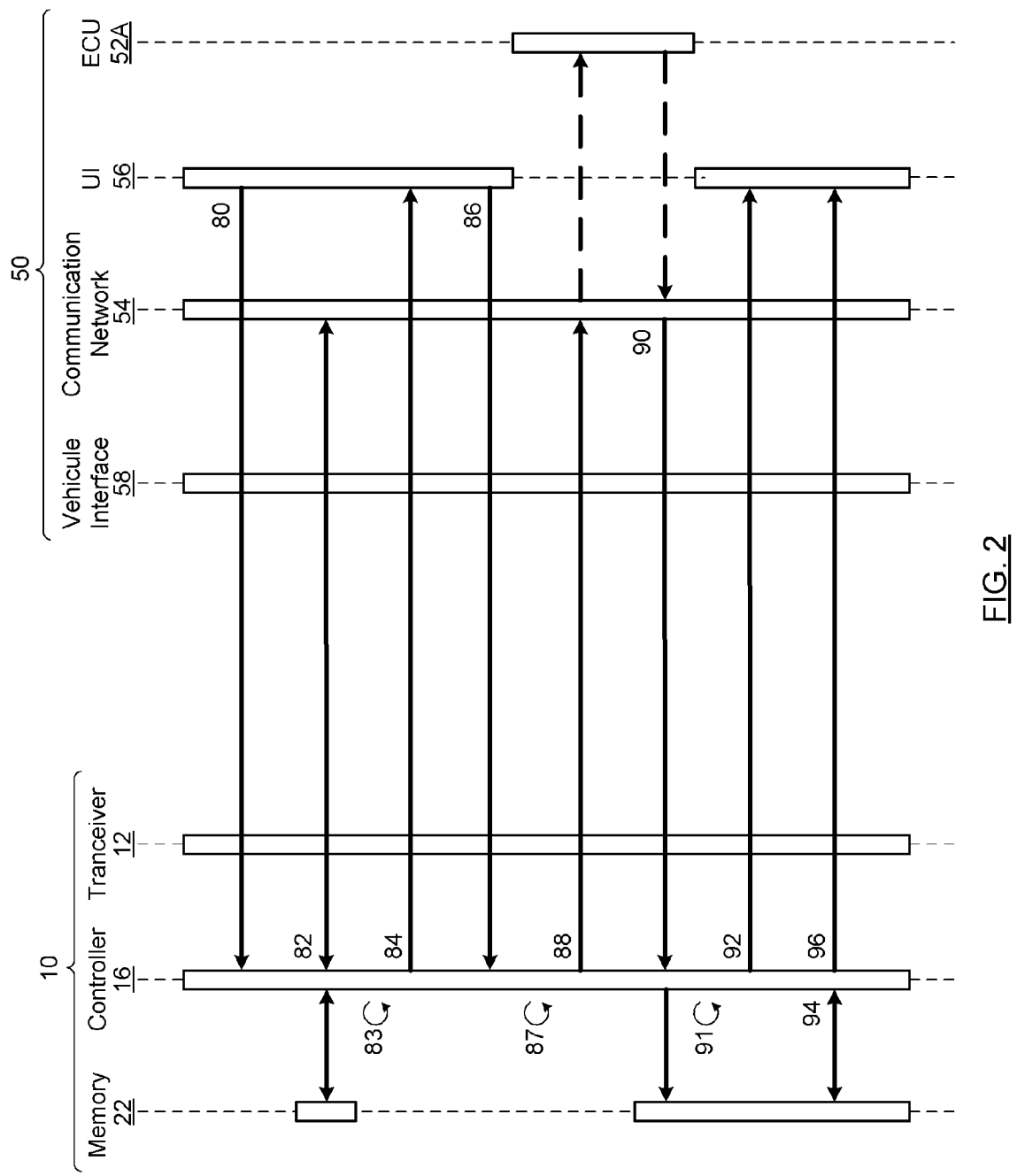
FIG. 2 is a sequence diagram showing steps of a method according to an embodiment of the present invention.

Preferably, the controller 16 is adapted to receive feedback information from the communication network, as represented by step 90 in FIG. 2, the feedback information being related to said targeted one of the one or more ECU, and the add-on device 10 further comprises a memory 22 which is in communication with the controller 16 for storing at least a portion of the feedback information. Indeed, it is to be understood that some of the feedback information may be used only for processing at the controller, without being stored in memory. Moreover, some of the feedback information may be immediately presented on the user interface in real-time, without necessarily storing all the data being presented, as represented at step 92 in FIG. 2. The memory 22 may be provided integrally with the add-on device 10, as represented in FIG. 1. Alternatively or additionally, the memory 22 may be in the vehicle 50, or in an external device (for example a computer) being in communication with the controller 16 over a physical or wireless connection, etc.

The term "memory" refers to a data storage device or assembly of devices including, for example: a temporary storage unit such as a random-access memory (RAM) or dynamic RAM; a mass storage such as a hard disk; an optical storage device, such as a CD or DVD (rewritable or write once/read only); a flash memory; and/or the like.

Preferably, with reference to FIG. 1, the controller 16 is provided with an integral memory 24 for storing processing data and instruction. Still preferably, an external memory 26 is connected to the controller for storing parameters or information collected, such as the above-mentioned feedback information.

Preferably, the user interface 56 of the vehicle 50 comprises an instrument cluster, a display screen, a control button, a touchscreen, a speaker and/or a microphone.

Preferably, a display screen presents information to the user in the form of text (for example, a menu of functionalities, requested information on an ECU, etc.) and the user may input information (navigation command, selection, etc.) via buttons. In an alternative embodiment a touchscreen is used for both receiving and outputting information from and to the user.

According to an embodiment of the present invention, the vehicle interface 58 comprises an on-board diagnostics (OBD) connection port 60 and the transceiver 20 comprises a corresponding OBD connector 20, which is adapted to connect with the OBD connection port 60. Preferably, the communication network 54 includes one or more interconnected data bus 62 (see FIG. 3) and the add-on device 10 comprises a transceiver 12 for each of said one or more data bus, the transceiver 12 communicating with the data bus(es) 62 via the OBD connector 20.

As previously mentioned, the connection port 60 may be adapted to provide physical or wireless connection with the OBD connector 20 of the device 10. Thus, according to such an embodiment, the vehicle interface 58 and the transceiver 20 of the add-on device 10 are adapted to communicate wirelessly.

According to an alternate embodiment, the vehicle interface 58 comprises a wire connection with the communication network 54 and the transceiver 12 is connectable to said wire connection. In such an embodiment, the add-on device 20 may be connected permanently or semi-permanently to the vehicle's communication system. It is to be understood that the add-on device 20 may be connected permanently even with a connection via the OBD connector port 60.

Thus, the device 10 comprises one or more transceiver(s) 12 for communicating with the communication network 54 of the vehicle 50 with respect to information related to a component $52_A$ of the vehicle 50. The device further includes a controller 16 for receiving and processing data received from the transceiver(s) 12.

The device 10 further comprises conversion means 14 for communicating with different components of the vehicle 50. The conversion means 14 are preferably provided in the form of data and instructions stored on a memory 22, which are readable and operable by the controller 16, in order to allow proper processing of the data exchanged with the user interface 56, ECU 52, communication network 54 and/or the like, in order to allow communication with said user interface 56, ECU 52, communication network 54 and/or the like of the vehicle 50. For example, the conversion means 14 may allow the controller 16 to prepare a message in a format that will be understood by a particular vehicle (i.e. communication protocol, for example Key Word Protocol 200, ISO 14230, etc. or proprietary protocols) and convert data received from the vehicle, into a particular format which is processable by the controller 16. Namely, the conversion means 14 preferably converts messages to and from the various ECU(s), including the ECU(s) of the user interface 56. The conversion means 14 may be embedded, in part or in totality, in the controller 16, according to embodiments of the present invention.

Referring now to FIG. 2, a method of operation of the add-on device 10 will be described.

The method comprises at step 80, receiving, at the controller 16, an activation command from the user interface 56, the activation command instructing activation of the add-on device 10 (i.e. activating the capability of device 10 to manage the one or more ECU). Such an activation command may include for example, pressing a predetermined button, or any button of the user interface 56, for a predetermined period of time. According to another example, an activation command may be generated by pressing a combination of buttons or performing a combination of operations on the user interface of the vehicle.

The method further comprises at step 82, retrieving vehicle information from the communication network 54, and validating this vehicle information, by means of the controller 16, based on one or more validation rule stored in memory 22, in order to activate the add-on device 10. For example, the add-on device may verify the speed of the vehicle, to ensure that it is immobile before activating the add-on tool. Preferably, this step is executed regularly, in order to monitor the vehicle information. For example, if the vehicle is no longer immobile, the add-on tool, is preferably automatically deactivated. According to another example, if a particular component which has priority over the add-on tool described herein, requires use of components of the user interface, the processing or a portion thereof may be interrupted as well. The same applies if the add-on device is interfering with the operation of the vehicle. The one or more validation rules are preferably stored in the memory 22 of the add-on device 10.

The method further comprises at step 83, generating a user-interface control signal, by means of the controller 16, and sending it at step 84, by means of the transceiver 12, onto the communication network 54 of the vehicle 50, in order to present on the user interface 56 command options prompting a user to enter a command selection in response thereto. The user-interface control signal is addressed to the user interface 56 of the vehicle 50 in order to manipulate the user interface 56. Thus, the user-interface control signal preferably includes instructions to display a menu of options, and navigation commands (to navigate through the options), as well as the data to be presented (labels of each option). Preferably, the command options (i.e. in the form of a menu) are presented in text format on a display screen. It is to understood that any of the information (menu, requested information, feedback information, etc.) may be displayed or provided in any suitable format, for example, icon, image, animation, color code, alphanumeric characters, symbols, sounds, light, and/or the like, as can be easily understood by the skilled person.

The method further comprises at step 86, receiving the command selection, at the controller 16, via the communication network 54 and vehicle interface 58. The options presented on the user interface are preferably related to a particular operation to be performed with respect to a particular one or more ECU. Accordingly, the command selection received at the controller 16 is representative of the selected operation to be executed with respect to one or more targeted ECU(s) $52_A$.

The method further comprises at step 87, generating, by means of the controller 16, an ECU control signal in response to the command selection received, and sending it at step 88, by means of the transceiver 12, to the communication network 54 for executing said operation. Thus, the method allows a user to manage the targeted ECU(s) $52_A$ from the user interface 56 of the vehicle 50.

The operation performed may include: reading status information on the communication network 54 concerning the targeted ECU(s) $52_A$, retrieving data from the targeted ECU(s) $52_A$, pushing data to said targeted ECU(s) $52_A$ (for example, resetting a parameter), performing an operation on the targeted ECU(s) $52_A$ (for example, reprogramming, manually activating or otherwise controlling an ECU), and/or the like.

Preferably, the method further includes, after step 90, receiving feedback data from the targeted ECU $52_A$ at the controller 16 (and/or at the memory 22), via the transceiver 12, in response to the operation executed at step 88. The method further includes generating a feedback message at step 91, by means of the controller 16, the feedback message being addressed to the user interface 56 of the vehicle 50, and at step 92, sending the feedback message, via the transceiver 12 and the communication network 54, to the user interface 56 of the vehicle 50 to present thereon the feedback message. Feedback data may include, for example: a diagnosis trouble code, a status of an ECU, information requested to one of the ECUs, information on the status of the operation (completed, in progress, etc.). It is to be understood that the feedback information may be provided by a plurality of ECU(s), as can be easily understood by a person skilled in the art. Furthermore, it is to be understood that the feedback information may be requested by means of a corresponding command selection entered at the user interface 56. It is to be understood also that the feedback information may be obtained by communicating directly with one or more targeted ECU(s), or alternatively by capturing broadcasted data on the communication network 54, as can also be readily understood by the skilled person.

Preferably, the method further includes, at step 90, storing the feedback data in the memory 22. Still preferably, the method further includes, as represented by step 94, reading the feedback data stored in the memory 22, by means of the controller 16; and at step 96 generating and sending a report message including at least a portion of the stored feedback data, to the user interface of the vehicle to present thereon said report message. The report message may include a number of unitary data to be presented on the user interface, as well as presentation instructions, etc.

It is to be understood that steps 83, 84, 86, 87, 88, 90, 91, 92, 94, 96, and even 82, may be repeated a number of times and in a multitude of sequences, as can be easily understood by a person skilled in the art. In some cases, some of the steps may be performed simultaneously, for example, performing an operation on an ECU while storing the feedback information in memory and/or outputting feedback information onto the user interface. Still, according to embodiments of the present invention, any of the above steps may include a plurality of sub-steps. For example, step 84, of presenting a menu, may include exchanges of data and instructions between the user interface and the controller before the user eventually selects an operation to be performed.

Figure 3:
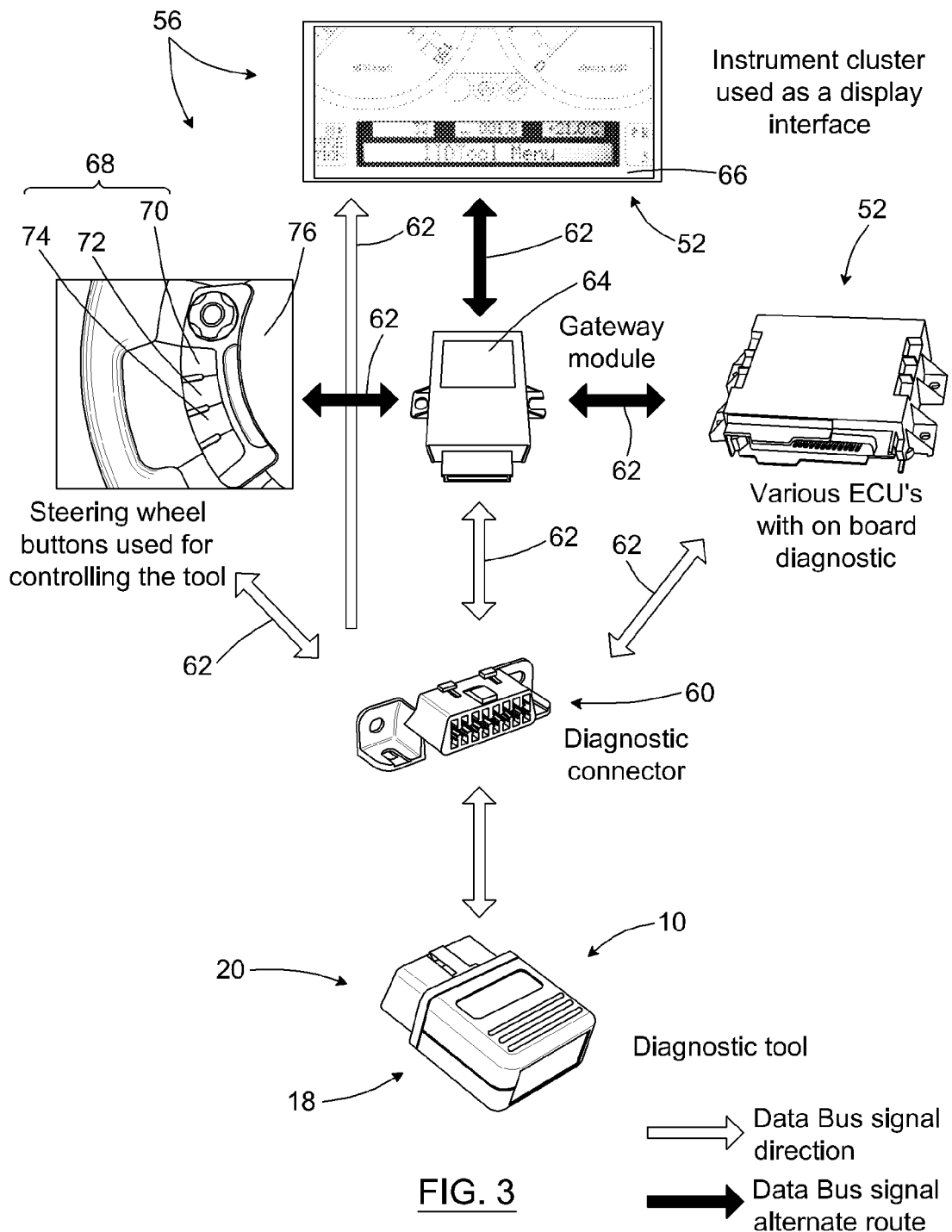
FIG. 3 is a schematic diagram of a diagnostic add-on device according to an embodiment of the present invention, the diagnostic device being shown with components of a vehicle.

Referring now to FIG. 3, the diagnostic tool, according to an embodiment of the present invention will be described, namely as implemented on a Land Rover™ (Range Rover 2005™). According to this embodiment, the electronic device 10 comprises a housing 18 and a OBD connector 20. With further reference to FIG. 1, the housing 18 houses therein a printed circuit board (PCB) 28, having mounted thereon a microcontroller 21 (i.e. controller 16), a memory 22, and a transceiver 12 for each data bus 62 in the vehicle's communication network 54. The tool connects, via the diagnostic connector port 60 (also referred to herein as "OBD connection port"), to the multiple data buses, namely CAN and DS2™ buses in the present case, generally identified by reference number 62. These data buses 62 form the vehicle's communication network 54 (see FIG. 1). The tool 10 is thus enabled to perform any diagnostic function on these two data buses 62, similarly to other existing diagnostic tools.

In order to receive input information and/or commands from a user, the tool 10 perform queries on the data bus(es) 62 at regular intervals as to the state of particular buttons 68 of the vehicle 50. In the present case, three (3) buttons 70, 72 and 74, normally used for the cruise control feature of the vehicle, are used for interacting with the diagnostics device. These buttons are provided on the steering wheel 76 and are connected to the vehicle's communication system 54, through the rotary coupler ECU (electronic control module) on the I-Bus™ data bus and accessible on the DS2™ data bus through a gateway module 64. As shown in FIG. 3, there is provided in the present case, a first button 70 which is normally used for increasing speed when using the cruise control, another button 72 normally used for decreasing the speed and a third button 74 normally used for resuming the cruise control feature. Upon activating the diagnostic mode provided by the add-on device 62, the first and second buttons 70, 72 serve for allowing a user to scroll up and down menu options and/or for increasing and decreasing values of a parameter. The resume button 74 is used as a selection button (i.e. "enter" button). Preferably, in order to put the user interface into the diagnostic mode, the tool 10 must first be plugged into the OBD connection port 60, and then the resume button 74 must be pressed and held down for a minimum of ten (10) seconds, as represented by step 80 in FIG. 2. Additionally, some conditions are verified prior to entering into the diagnostic mode, for security purposes, avoiding contention, etc., as represented by step 82 in FIG. 2. Indeed, the tool preferably verifies that the speed of the vehicle is at zero, in order to ensure that the vehicle is not moving and that the transmission is in "park" mode. Upon validating the necessary information, the user interface is then activated, that is to say, the diagnostic mode of the device 10 is activated, so as to manipulate the user interface 56 of the vehicle 50, as previously described.

It is to be understood that a number of additional and/or alternative conditions may be further verified and validated, prior to engaging the diagnostic mode. Moreover, the diagnostic mode starting command and/or any other command or feature may be implemented in a number of different ways, as can be easily understood by a person skilled in the art. Indeed and for example, for engaging the diagnostic mode, another button as the start command may be used, and any suitable minimal predetermined time period for pressing down the button may be established, a particular sequence of button may be pressed, etc.

In other words, in order to operate the add-on device according to an embodiment shown in FIG. 3, the add-on tool is plugged into the vehicle's OBD port with the vehicle remaining stationary (i.e. "park" or "neutral" mode) and the motor running. The cruise control buttons are used to enter user commands and navigate within the menu presented by the add-on tool, while information is displayed in the instrument cluster display.

In accordance with an embodiment of the present invention, the add-on tool uses the cruise control buttons for the following functions :

"Resume" button:
    for a 'Start the add-on tool function' command (corresponding to a user command for activating the add-on tool functionality); and
    for an 'Enter' command (corresponding to a user selection);

"+" and "−" buttons:
    for 'Menu up' and 'Menu Down' commands (corresponding to respective user commands for navigating up and/or down menu items presented on the user interface, for example on a display screen), or
    for 'Value Up' and 'Value down' commands, (corresponding to respective user commands for increasing or decreasing a value of a parameter, for example, in the case of programming and/or calibration); and "on/off" button for:
    a 'Back one level' command (corresponding to a user command to navigate "backwards" in the menu, i.e. to go back one level of the menu); or
    a 'Quit add-on tool function' command if the button is pressed for a longer period of time, for example, 3 sec or more (corresponding to a user command for deactivating the add-on tool functionality).

Referring back to FIG. 3, queries and response messages are made between the tool and an Instrument Pack (IPack) ECU 66 on the DS2™ bus 62. The IPack ECU 66 may include an information center and/or LCD screen, etc. The IPack ECU 66 receives the states of each button 70, 72 and 74 on the steering wheel 76 via the rotary coupler on an internal I-bus™ data bus 62 and acts as a gateway 64 between the tool and the rotary coupler.

To present information to the user, the tool 10 sends a message on the data buses 62, to be displayed on the information message center 56 on the instrument cluster provided on the dash board of the vehicle, namely in the present case, via the IPack ECU 66 on the DS2™ data bus 62. This is represented by steps 84, 92, 96 in FIG. 2. The capability of the IPack 66 to display messages from the DS2™ data bus 62, is believed to be operable by way of the gateway 64 which translates messages from the DS2™ data bus to the I-bus™. The information center 66 simply reacts to a message received from the I-bus™ 62, as it does when an ECU 52 transmits a message on the I-bus™.

It is to be understood that the particular configuration of the communication network, of the various electronic components and modules and of the user interface components described or mentioned herein, as well as their interconnections, may vary from one vehicle to another. Thus, depending on the particular data buses, message formats, particular electronic components and modules connected to the vehicles communication network, etc., the OBD device may be adapted accordingly. Moreover, the device may be adapted to diagnose and/or provide adjustments to a number of ECUs having onboard diagnostic capabilities.

Moreover, it is to be understood that information may be output to the user, using text, an image, a video, audio-data and/or the like, depending on the capabilities and limitations of the user interface components, and provided the concerned data buses are capable of transmitting the necessary data. Protocols used for communication on the different data buses are defined by normalization organizations (SAE and ISO) or by vehicle manufacturers.

When the device is connected, it acquires information from various vehicles computers and displays them on the interface, according to rules and conditions, typically stored in the form of a computer readable program (i.e. program readable by the microcontroller in the OBD device).

According to a first scenario, the user may browse through the information and for example clear fault codes using the steering wheel buttons as command buttons. The device may then be removed and the vehicle interface is restored to its original state.

According to another scenario, the diagnosis and/or adjustment device described herein, may be applied for viewing error codes in the suspension module, including resetting an error code, adjusting the height, reprogramming an ECU, etc.

It is to be understood that the device described herein may be adapted for a plurality of different electronic components for a vehicle, which may include the suspension module, the engine module (for detecting functional problems with respect to the engine), the transmission, vehicle lights, etc.

Moreover, as previously mentioned, the device may be configured to be plugged into the OBD connector port or it may to be connected by wire, for example if a permanent connection is desired. The device described herein may be further applied to a variety of other electronic modules, as previously mentioned, in order to view error codes, live data, send commands, receive other useful data, as well as to process such data and/or commands, and output resulting information on the user interface.

The command signals and interfaces used depend on the vehicle for which it is intended, and/or on user preference, etc. Embodiments of the present invention allow a manufacturer to offer a complete, user friendly and very small device for a fraction of the cost for regular diagnostic tools. The tool may be used with the vehicle at any convenient location and time, without requiring a computer.

The above-described embodiments are considered in all respect only as illustrative and not restrictive, and the present application is intended to cover any adaptations or variations thereof, as apparent to a person skilled in the art. Of course, numerous other modifications may be made to the above-described embodiments without departing from the scope of the invention, as apparent to a person skilled in the art.

The invention claimed is:

1. An add-on device for managing an electronic control unit (ECU) of a vehicle having one or more of said ECU, a communication network linked thereto for circulating data related to the one or more ECU, and a user interface being integrated in the vehicle and communicating with the communication network, the vehicle further having a vehicle interface communicating with the communication network, the add-on device comprising:
   a transceiver adapted to cooperate with the vehicle interface for communicating with the communication network; and
   a controller being communicatively connected to the transceiver, and adapted to generate a user-interface control signal addressed to said user interface, in order to manipulate the user interface of the vehicle and to present thereon command options prompting a user to enter a command selection in response thereto, the command selection being representative of an operation to be executed with respect to a targeted one of the one or more ECU, the controller being further adapted to receive the command selection from the user interface, and to generate in response thereto, an ECU control signal to be sent via the transceiver, to the communication network for executing said operation, in order to manage the targeted ECU from the user interface of the vehicle.

2. The add-on device according to claim 1, wherein the controller is adapted to receive feedback information from the communication network, the feedback information being related to said targeted one of the one or more ECU, the add-on device further comprising: a memory being in communication with the controller for storing at least a portion of the feedback information.

3. The add-on device according to claim 1, in combination with the vehicle, wherein the user interface of the vehicle comprises at least one of: an instrument cluster, a display screen, a control button, a touchscreen, a speaker and a microphone.

4. The add-on device according to claim 1, in combination with the vehicle, wherein the vehicle interface comprises an on-board diagnostics connection port and the add-on device comprises a corresponding OBD connector being connected to the transceiver.

5. The add-on device according to claim 1, in combination with the vehicle, wherein the vehicle interface comprises a wire connection with the communication network and the transceiver is connectable to said wire connection.

6. The add-on device according to claim 1, in combination with the vehicle, wherein the vehicle interface and the transceiver of the add-on device are adapted to communicate wirelessly.

7. The add-on device according to claim 1, in combination with the vehicle, wherein the communication network includes one or more interconnected data bus and wherein the add-on device comprises a transceiver for each of said one or more data bus.

8. A method for managing an electronic control unit (ECU) of a vehicle having one or more of said ECU, a communication network linked thereto for circulating data related to the one or more ECU, and a user interface integrated in the vehicle and communicating with the communication network, the vehicle further having a vehicle interface communicating with the communication network, the method comprising:
- a) generating a user-interface control signal, by means of a controller in an add-on device, the user-interface control signal being addressed to the user interface of the vehicle in order to manipulate said user interface;
- b) sending the user-interface control signal, by means of a transceiver communicatively connecting the controller with the vehicle interface, onto the communication network of the vehicle, in order to present on said user interface, command options prompting a user to enter a command selection in response thereto;
- c) receiving the command selection, at the controller, via the communication network and vehicle interface, the command selection being representative of an operation to be executed with respect to a targeted one of the one or more ECU;
- d) generating, by means of the controller, an ECU control signal in response to the command selection received; and
- e) sending the ECU control signal, by means of the transceiver, to the communication network for executing said operation, in order to manage the targeted ECU from the user interface of the vehicle.

9. The method according to claim 8, further comprising, prior to step (a):
receiving, at the controller, an activation command from the user interface, said activation command instructing activation of the add-on device.

10. The method according to claim 8, further comprising, prior to step (a):
retrieving vehicle information from the communication network; and
validating said vehicle information, by means of the controller, based on one or more validation rule in order to activate the add-on device.

11. The method according to claim 8, wherein the operation of step (e) comprises at least one of: reading status information on the communication network concerning the targeted one of the one or more ECU; retrieving data from the targeted one of the one or more ECU; pushing data to said targeted one of the one or more ECU; and
performing an operation on said targeted one of the one or more ECU.

12. The method according to claim 8 further comprising, after step (e):
at the controller, receiving feedback data from said targeted one of the one or more ECU, via the transceiver, in response to the executed operation;
generating a feedback message, by means of the controller, said feedback message being addressed to the user interface of the vehicle; and
sending the feedback message, via the transceiver and the communication network, to the user interface of the vehicle to present thereon the feedback message.

13. The method according to claim 12, further comprising:
storing the feedback data in a memory.

14. The method according claim 13, further comprising:
reading the feedback data stored in the memory, by means of the controller;
generating a report message including at least a portion of the stored feedback data;
sending the report message, via the transceiver and the communication network, to the user interface of the vehicle to present thereon said report message.

15. A non-transitory processor-readable storage medium for managing an electronic control unit (ECU) of a vehicle having one or more of said ECU, a communication network linked thereto for circulating data related to the one or more ECU, and a user interface integrated in the vehicle and communicating with the communication network, the vehicle further having a vehicle interface communicating with the communication network, the processor-readable storage medium comprising data and instructions for execution by a controller in an add-on device to:
- a) generate a user-interface control signal being addressed to the user interface of the vehicle in order to manipulate said user interface;
- b) send the user-interface control signal, by means of a transceiver communicatively connecting the controller with the vehicle interface, onto the communication network of the vehicle, in order to present on said user interface, command options prompting a user to enter a command selection in response thereto;
- c) receive the command selection, the command selection being representative of an operation to be executed with respect to a targeted one of the one or more ECU;
- d) generate an ECU control signal in response to the command selection received; and
- e) send the ECU control signal, by means of the transceiver, to the communication network for executing said operation, in order to manage the targeted ECU from the user interface of the vehicle.

16. An add-on kit for managing an electronic control unit (ECU) of a vehicle having one or more of said ECU, a communication network linked thereto for circulating data related to the one or more ECU, and a user interface being integrated in the vehicle and communicating with the communication network, the vehicle further having a vehicle interface communicating with the communication network, the add-on kit comprising:
a transceiver adapted to cooperate with the vehicle interface for communicating with the communication network; and
a controller being adapted to communicate with the transceiver, and being further adapted to generate a user-interface control signal addressed to said user interface, in order to manipulate the user interface of the vehicle and to present thereon command options prompting a user to enter a command selection in response thereto, the command selection being representative of an operation to be executed with respect to a targeted one of the one or more ECU, the controller being further adapted to receive the command selection from the user interface, and to generate in response thereto, an ECU control signal to be sent via the transceiver, to the communication network for executing said operation, in order to manage the targeted ECU from the user interface of the vehicle.

* * * * *